United States Patent
Vasekin et al.

(10) Patent No.: US 8,954,715 B2
(45) Date of Patent: Feb. 10, 2015

(54) THREAD SELECTION FOR MULTITHREADED PROCESSING

(75) Inventors: Vladimir Vasekin, Cambridge (GB); Andrew Christopher Rose, Cambridge (GB); Allan John Skillman, Kettering (GB); Antony John Penton, Cambridge (GB)

(73) Assignee: ARM Limited, Cambridge (GB)

( * ) Notice: Subject to any disclaimer, the term of this patent is extended or adjusted under 35 U.S.C. 154(b) by 286 days.

(21) Appl. No.: 13/422,539

(22) Filed: Mar. 16, 2012

(65) Prior Publication Data
US 2012/0260070 A1    Oct. 11, 2012

(30) Foreign Application Priority Data

Apr. 5, 2011  (GB) .................................. 1105724.7

(51) Int. Cl.
*G06F 9/38*    (2006.01)
*G06F 11/267*  (2006.01)

(52) U.S. Cl.
CPC ................ *G06F 9/38* (2013.01); *G06F 11/267* (2013.01); *G06F 9/3851* (2013.01)
USPC ...................................................... 712/215

(58) Field of Classification Search
CPC combination set(s) only.
See application file for complete search history.

(56) References Cited

U.S. PATENT DOCUMENTS

| | | | | |
|---|---|---|---|---|
| 6,070,009 A * | 5/2000 | Dean et al. | .................... | 717/130 |
| 6,578,065 B1 | 6/2003 | Aglietti et al. | | |
| 7,197,652 B2 * | 3/2007 | Keller et al. | .................. | 713/320 |
| 7,353,517 B2 | 4/2008 | Accapadi et al. | | |
| 7,631,308 B2 * | 12/2009 | Bishop et al. | ................. | 718/102 |
| 7,853,950 B2 * | 12/2010 | Lewis | ........................... | 718/102 |
| 7,870,406 B2 * | 1/2011 | Arndt et al. | ................... | 713/322 |
| 2002/0174166 A1 | 11/2002 | Ang | | |
| 2004/0163083 A1 | 8/2004 | Wang et al. | | |
| 2004/0193854 A1 | 9/2004 | Cho | | |
| 2006/0161762 A1 | 7/2006 | Eisen et al. | | |
| 2006/0179439 A1 | 8/2006 | Jones et al. | | |
| 2007/0168649 A1 | 7/2007 | Anderson et al. | | |
| 2010/0088491 A1 * | 4/2010 | Fusejima et al. | .............. | 712/218 |
| 2010/0287561 A1 * | 11/2010 | Floyd et al. | .................... | 718/108 |

OTHER PUBLICATIONS

UK Search Report for GB1105724.7, dated Aug. 2, 2011.

* cited by examiner

*Primary Examiner* — Eric Coleman
(74) *Attorney, Agent, or Firm* — Nixon & Vanderhye P.C.

(57) ABSTRACT

A multithreading processor 4 interleaves program instructions from different program threads to perform fine grained multithreading. Thread performance monitoring circuitry 30 monitors performance parameters of individual program threads to generate performance values. Issue control circuitry 28 reads these performance values to determine which program thread is next selected to be active when a thread switch event occurs. The performance parameters measured may include the proportion of cycles in which a program thread is able to provide a program instruction for execution by the execution circuitry 12 within the processor 4.

18 Claims, 4 Drawing Sheets

THREAD SELECTION FOR MULTITHREADED PROCESSING

This application claims priority to GB Application No. 1105724.7 filed Apr. 5, 2011, the entire contents of which are incorporated herein by reference.

BACKGROUND OF THE INVENTION

Field of the Invention

This invention relates to the field of data processing systems. More particularly, this invention relates to the selection of program threads for execution within a multithreaded processing system.

Field of the Invention

It is known to provide processing systems which utilise coarse grained multithreading and/or fine grained multithreading. In coarse grained multithreading different program threads may be selected to be active at different times. In fine grained multithreading program instructions from different program threads are interleaved with each other and fed to the execution mechanisms as a stream of program instructions to be executed. It is often the case that there will be more program threads for execution than can be simultaneously interleaved with fine grained multithreading. Accordingly, a selection is made as to which program threads are active at a given time.

A simple selection mechanism may select the different program threads in turn at the coarse grained level for execution. A problem with this approach is that when the program instructions from the currently active program threads are interleaved, each program thread may not be capable of issuing a program instruction for execution at each cycle. For example, data dependencies between program instructions within a program thread may require a program instruction to be stalled awaiting completion of an earlier program instruction before it may be issued. It is possible that a different program thread that is currently active may be able to use the cycles for which another program thread is stalled. However, it is also possible that a number of program threads which are simultaneously active may be such that they all suffer from a significant amount of stalling and accordingly the resources of the data processing system are inefficiently used as the active threads are not able to issue program instructions at every cycle.

SUMMARY OF THE INVENTION

Viewed from one aspect the present inventions provide apparatus for processing data comprising:

execution circuitry configured to execute program instructions;

issue control circuitry coupled said execution circuitry and to configured to select program instructions from among a plurality of program threads to form a sequence of program instructions to issue to said execution circuitry, said issue control circuitry being configured to select said program instructions such that program instructions from different program threads of said plurality of program threads are interleaved within said sequence; and thread performance monitoring circuitry coupled to issue control circuitry and configured to measure a plurality of performance values, each of said plurality of performance values being indicative of a performance parameter of one said plurality of threads; wherein said issue control circuitry is configured to select from which of said plurality of program threads program instructions are to be issued to said execution circuitry in dependence upon said plurality of performance values.

The present technique recognises the above problem and provides thread performance monitoring circuitry which serves to measure a plurality of performance values with each of these performance being indicative of a performance parameter of one of the plurality of threads. The issue control circuitry which serves to select which program threads are active can then use these performance values to select which program threads are to be active in a way in which the efficiency with which the execution circuitry may be utilised can be improved.

It will be appreciated that the performance monitoring circuitry value may monitor a wide variety of performance parameters. However, in some embodiments the performance values indicate for each of the program threads a proportion of cycles for which program instructions of that thread have been available for issue. A program thread which rarely suffers from stalls will have a performance value indicative of a high proportion of cycles being ones where a program instruction from that program thread was available for issue. Conversely, a program thread which suffers from significant data dependency hazards and/or branch miss predictions will have a performance value indicating that the proportion of cycles in which that program thread is able to issue program instructions is relatively low.

Within the context of such performance values, the issue control circuitry may select a next program thread from which program instructions are to be issued such that it complements the one or more program threads with which it will be contemporaneously active. In particular, it is efficient if the active program threads together combine such that their performance values indicate that between them the proportion of cycles in which they will be able to issue program instructions is close to unity. Thus, a program thread which has a performance value indicative of program instruction availability on a high proportion of cycles may be matched with a program thread with a performance value indicative of program instructions being available on a low proportion of cycles such that together the proportion of cycles from which program instructions are available for issue is substantially unity (i.e. together they are able to issue a program instruction on substantially every cycle).

Matching the measured performance characteristics of the program threads makes it possible to avoid the situation in which program threads are combined which inefficiently under utilise the execution resources as well as the situation in which program threads are combined which inefficiently compete with each other for the execution resources. Another selection criteria that may be applied is that the combined proportion of issue cycles predicted used will be not less than unity.

There may be a variety of reasons why a program thread is not able to issue a program instruction at any given title. Particular such circumstances include operand dependences between instructions and that a next instruction to be issued within a thread has not yet been fetched from memory, such as a consequence of a branch miss prediction. There may be other reasons why a particular program thread is not able to issue its next instruction at a given cycle.

The thread performance monitoring circuitry may comprise a counter associated with each active program thread with this counter being configured to accumulate a count value in dependence upon whether or not the corresponding thread has a program instruction available for issue at each cycle. The accumulated count value could count either the cycles in which an instruction is available for issue or conversely the cycles in which an instruction is not available for issue. Both of these counts may be used to indicate the proportion of available cycles which that program thread was able to utilise. This measured performance is used to predict the behaviour of that program thread when it is next selected and accordingly may be used by the issue control circuitry to select program threads for execution in combination that will have complementary processing demands.

The counter may be configured to accumulate the count value over predetermined accumulation period after which the count value is reset and the accumulation restarted. This effectively forms a measurement period over which the performance value for an active program thread is determined. This predetermined accumulation period may be made a user configurable parameter such that the performance monitoring circuitry may be tuned to the type of program threads being executed.

In order to avoid the situation in which a particular program thread is never selected for execution due to its performance characteristics being incompatible with other program threads, in some embodiments the issue control circuitry may be configured to select for issue independently of the performance values program instructions from a program thread from which program instructions have not been selected for greater than a predetermined number of thread selections made by the issue control circuitry. Thus, the use of performance values may be overridden in the case of a program thread which has been inactive for too long.

The present technique is particularly useful for in-order execution environments as these typically are more prone to program threads stalling as they lack the flexibility of being able to select program instructions out-of-order for execution.

The program instructions for the active program threads may conveniently be held within an instruction queue so as to form a pool of ready-to-run instructions.

The issue control circuitry may perform its selection of a next program thread to be active (as well as flushing a currently active thread from execution) upon occurrence of a thread switch event. Thread switch events may include one or more of a miss within a cache memory, a timer triggered event, a miss within a translation lookaside buffer, an external interrupt(s) or the thread itself executing an instruction indicating that it should yield execution to another thread.

The issue control circuitry may be used within execution environments that support a single issue or multiple issue operation.

The issue control circuitry may interleave a large number of program threads, but fine grained interleaving with relatively little additional overhead and yet the ability to significantly improve execution resource utilisation may be achieved when two program threads are interleaved by the issue control circuitry.

It will be appreciated that the above has described preferred embodiments in which the performance value is indicative of the proportion of the cycles in which a program thread is able to provide a program instruction for issue. The performance value measured by the performance monitoring circuit could take different forms. In processing environments supporting multiple execution pipelines of different types, such as a arithmetic pipeline, a vector processing pipeline, a load/store pipeline etc, then a performance value being measured could indicate the proportion of program instructions within a given program thread which utilise these different pipelines. In this way, program threads could be selected for use together when they had complementary patterns of pipeline use, such as a program thread which heavily used the arithmetic pipeline being selected to be simultaneously active with a program thread which heavily used the load/store pipeline such that the two threads were not competing for the use of the same pipelines within the execution mechanisms. Further examples of performance values are also possible.

Viewed from another aspect the present invention provides apparatus for processing data comprising:

execution means for executing program instructions;

issue control means coupled said execution means for selecting program instructions from among a plurality of program threads to form a sequence of program instructions to issue to said execution means, said issue control means selecting said program instructions such that program instructions from different program threads of said plurality of program threads are interleaved within said sequence; and thread performance monitoring means coupled to issue control means for measuring a plurality of performance values, each of said plurality of performance values being indicative of a performance parameter of one said plurality of threads; wherein said issue control means selects from which of said plurality of program threads program instructions are to be issued to said execution means in dependence upon said plurality of performance values.

Viewed from a further aspect the present invention provides a method of processing data comprising the steps of:

selecting program instructions from among a plurality of program threads to form a sequence of program instructions to issue, said step of selecting operating to select said program instructions such that program instructions from different program threads of said plurality of program threads are interleaved within said sequence; and executing said program instructions that are issued; and measuring a plurality of performance values, each of said plurality of performance values being indicative of a performance parameter of one said plurality of threads; wherein said step of selecting selects from which of said plurality of program threads program instructions are to be issued to said execution means in dependence upon said plurality of performance values.

The above, and other objects, features and advantages of this invention will be apparent from the following detailed description of illustrative embodiments which is to be read in connection with the accompanying drawings.

DESCRIPTION OF THE EMBODIMENTS

Figure 1:
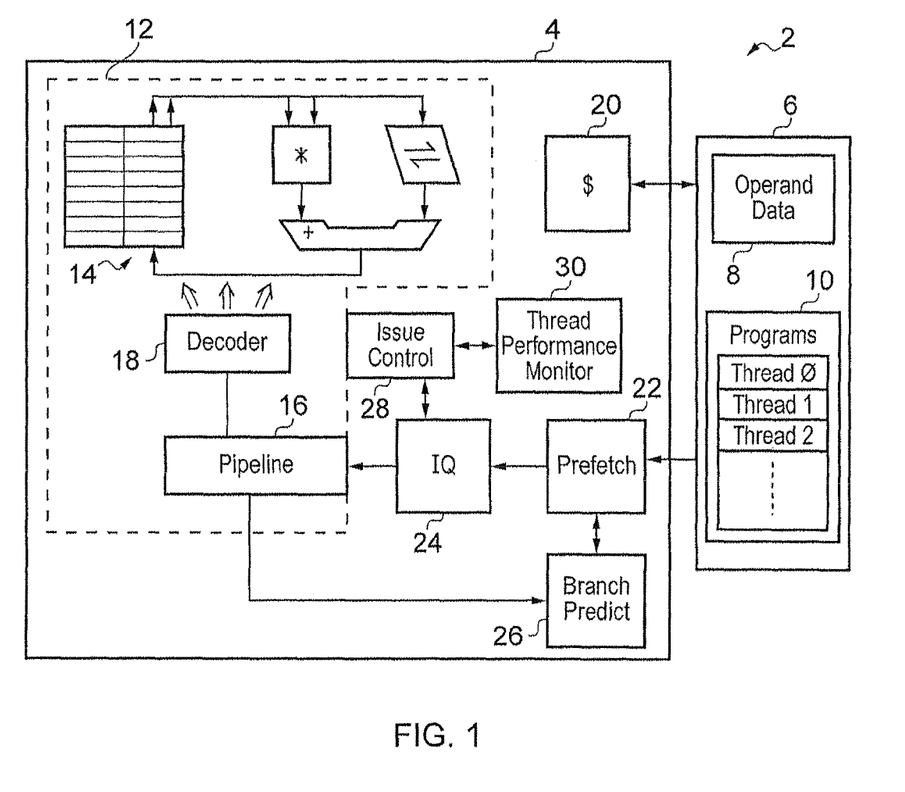
FIG. 1 schematically illustrates an apparatus for processing data using coarse grained and fine grained multithreading.

FIG. 1 schematically illustrates apparatus for processing data to comprising a processor core 4 coupled to a memory 6. The memory 6 stores operand data 8 to be manipulated and program instructions 10 which form multiple program threads. Each of these program threads contains a sequence of program instructions. This type of arrangement in which program instructions 10 to be executed may be divided in to a plurality of program threads will be familiar to those in this technical field. The multiple threading of the present techniques may be utilised to enable the processor 4 to appear from a programmer's point of view as multiple processors which each individually execute a respective program thread. When a program thread is no longer active, its data may be flushed from the processor 4 (e.g. register contents, program counter value, pointers and other state data) and when the program thread concerned is to be restarted this state data is restored to the processor 4 and execution continued in a manner in which from a programmers point of view appears as if the execution was continuous and the program thread had exclusive use of the processor 4.

The processor 4 includes execution circuitry 12, which in this example includes elements such as an arithmetic data path 14, pipeline circuitry 16 and an instruction decoder 18. It will be appreciated that this representation of the circuitry 12 is stylised and that in practice the execution circuitry 12 could take a variety of different forms, such as including multiple execution pipelines each tailored to a particular form of program instruction, such as an arithmetic pipeline, a load/store pipeline, a single-instruction-multiple-data pipeline etc. The processor core 4 includes a cache memory 20 in to which data values from the memory 6 may be stored. One reason a program thread switch event may arise is due to a cache miss within this cache memory 20. Such a cache miss will typically require a high latency memory fetch to the memory eight and accordingly it will be more efficient to switch to execution of a different program thread while this cache miss is resolved and the data required is fetched in to the cache 20.

The processor 4 includes prefetched circuitry 22 for prefetching program instructions from the memory 6 and supplying these to an issue queue 24 where they form a pool of ready-to-issue program instructions. The prefetch circuitry 22 may utilise 2 program counter values respectively pointing to the program instructions of two different program threads which are active and for which program instructions should be fetched. Branch prediction circuitry 26 may be used to predict conditional branches within the fetched instructions in accordance with known techniques. Such branch prediction is not guaranteed to be correct and accordingly branch miss prediction is one reason why program instructions from a currently active program thread may not be available for issue from the issue queue 24 at every processing cycle when the execution circuitry 12 is able to accept program instructions for execution.

Also illustrated in FIG. 1 is issue control circuitry 28 and thread performance monitoring circuitry 30. The issue control circuitry 28 controls which program instructions from the issue queue 24 are issued to the execution circuitry 12 at each program cycle. The issue control circuitry 28 can thus perform fine grained multithreading by interleaving program instructions issued to the execution circuitry between the currently active program threads. There are a plurality of program threads, typically two program threads, active at any time. The issue control circuitry 28 is also responsible for selecting which program threads are to be active at a given time. Inactive program threads have their context data (e.g. register contents, pointers, etc) saved to special purpose memory within the processor 4 when not in use. This state data may be rapidly restored when the program thread is selected by the issue control circuitry 28 to become active.

The issue control circuitry 28 is responsive to performance values measured by the thread performance monitoring circuitry 30 in determining which program threads should be selected to be active at any given time. Thread switch events which trigger the issue control circuitry 28 to flush (retire) a currently active thread and select a new program thread to be active can take a variety of forms. As previously discussed, one of these forms may be a cache miss within the cache 20. Another form of thread switch event may be a timer triggered event, such as a trigger derived from a watchdog timer. Another form thread switch event may be the execution within a program thread of a program instruction specifying that the program thread should itself be retired, i.e. a yield to another thread event. Further thread switch events include a miss within a translation lookaside buffer and an external interrupt(s).

The thread performance monitoring circuitry 30 monitors one or more performance parameters of the currently active program threads. These measured performance parameters may be used to predict which program threads will complement each other if selected to be active together. The issue control circuitry 28 is thus configured to select a next program thread to be active in dependence upon these measured performance values indicating performance parameters when the program threads concerned were last executed. One form of performance parameter that may be measured is one which indicates the proportion of cycles in which a given program thread was able to provide a program instruction available to be issued, e.g. the likelihood that the program thread suffered from data interlocks, branch mispredictions which prevented a program instruction being available for issue at every cycle.

Other forms of performance value and performance parameter are also possible. These performance values and performance parameters relate to an individual program thread and the characteristics of that program thread. The issue control circuitry 28 utilises these characteristics which have been measured in real time during actual execution of the program thread to determine a next program thread selected to be active so as to make more efficient use of the execution circuitry 12.

Figure 2:
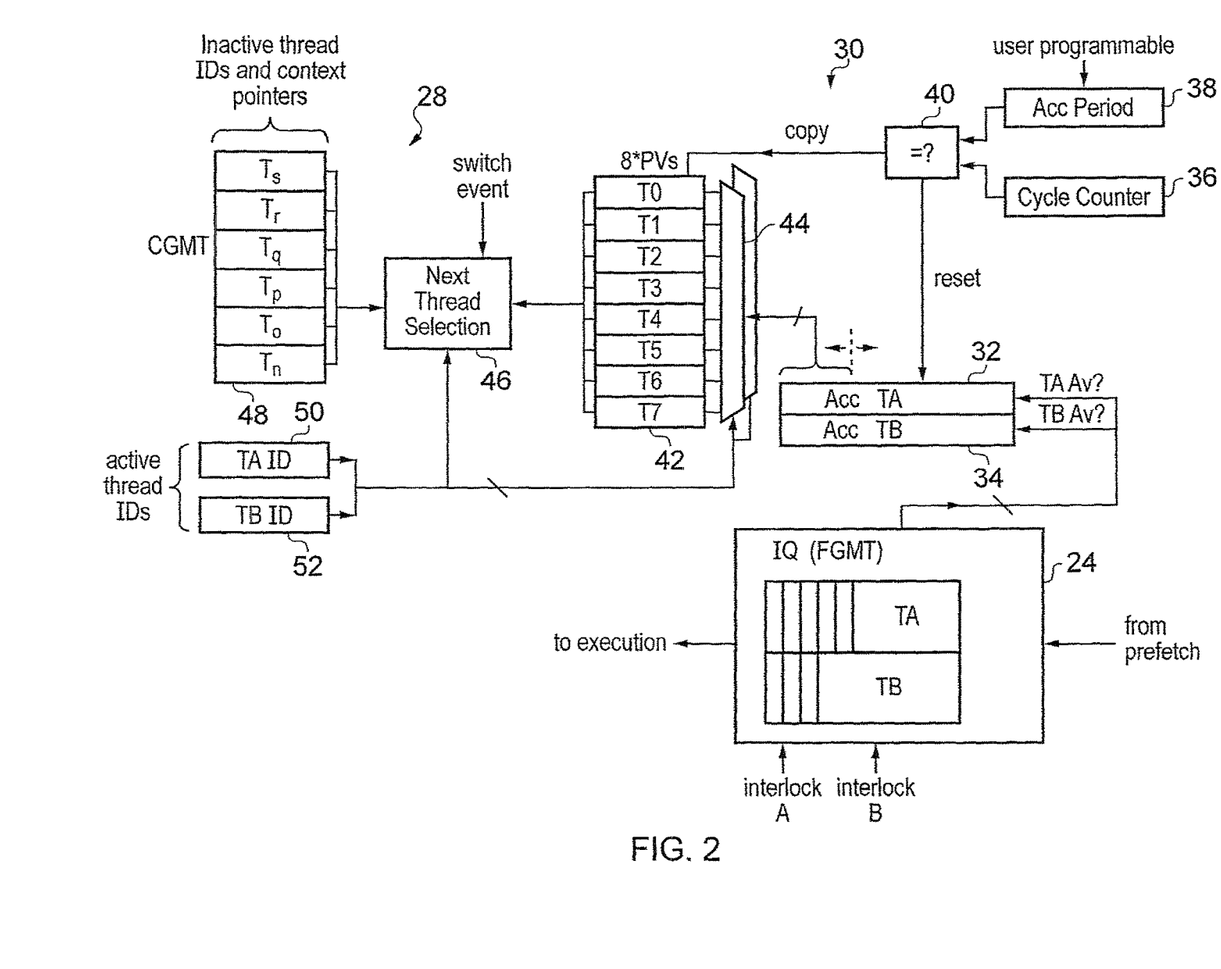
FIG. 2 schematically illustrates issue control circuitry, performance monitoring circuitry and an issue queue for controlling thread selection.

FIG. 2 schematically illustrates the issue queue 24, the issue control circuitry 28 and the thread performance monitoring circuitry 30. The issue queue 34 receives program instructions from the prefetch unit 22 and supplies program instructions to the execution circuitry 12. Supply of instructions to the execution circuitry 12 is issue of program instructions. In this example, the issue queue 24 may interleave the issue of program instructions from the two currently active threads TA, TB so as to achieve fine grained multithreading (FONT). Signals indicating data interlocks arising in either of the currently active threads TA, TB are supplied to the issue queue 24 such that an individual program thread may be stalled if a data hazard within that program thread arises. The non-stalled program thread desirably should be able to utilise the cycles in which the other program thread is stalled to continue to issue program instructions and thus make efficient use of the execution circuitry 12.

At each cycle at which the issue queue 24 may issue program instructions to the execution circuitry 12, signals TA AV and TB AV are generated and supplied to respective counters 32, 34 within the performance monitoring circuit 30 to indicate whether or not thread A had an instruction available for issue in that cycle and whether or not thread B had an instruction available for issue in that processing cycle respectively. The accumulated values within these counters 32, 34 over a predetermined accumulation period will thus provide a performance parameter indicative of the proportion of cycles within which the program thread concerned was able to provide a program instruction available for issue.

Also present within the performance monitoring circuitry is a cycle counter 36 and an accumulation period register 38. The accumulation period register 38 stores a user programmable accumulation period value defining the window of time within which the counters 32, 34 accumulate their values and accordingly the window of time over which the performance parameter is measured. A comparator 40 compares the content of the accumulation period register 38 with the cycle counter 36 and when these are equal issues a reset signal to reset the counters 32, 34 to zero these and a copy signal to copy a portion of the accumulated count values from the counters 32, 34 in to corresponding ones or performance value registers 42.

While it is possible that the full accumulated count could be stored as the performance value, in practice this provides too high a degree of resolution and the overhead of storing this data is not justified. Thus, sufficient information can be gained regarding the performance parameter of the thread concerned by storing the most significant bit portion of the accumulated value as the performance value. The most significant bit portion may have a width selected in dependence upon the currently programmed accumulation period value stored within the accumulation period register 38. If the accumulation period is short, then a larger most significant bit portion needs to be sampled in order to ensure distinguishing performance parameter information regarding the performance of the different program threads is captured. Multiplexers 44 serve to direct the values from the counters 32, 34 in to the appropriate performance value registers 42. In this example, eight program threads are supported. The program threads which are active at any given point of time TA, TB may be any of these eight program threads. Accordingly, the performance values are directed by the multiplexers 44 when the copy signal is generated by the comparator 40 so as to be stored in to the appropriate one of the performance value registers 42. The performance values stored within the performance value registers 42 thus represent the performance values measured by the performance monitoring circuitry 30 on the last occasion that the program thread concerned was active.

The issue control circuitry 28 includes next thread selection circuitry 46 which receives the performance values from the performance registers 42 and a signal indicating a thread switch event as previously discussed. Inactive thread registers 48 store the thread identifiers of the currently inactive threads in order of their latest time of activity. The currently active threads have their thread identifiers stored within active thread registers 50, 52. The inactive thread registers 48 may also store pointer values indicating where the state data for the inactive threads concerned is located within the special purpose on-chip memory of the processor 4.

As the currently active thread is flushed and rendered inactive, it is added to the end of the list inactive threads within the inactive thread registers 48. The next thread selection circuitry 46 at this time examines the performance value of the program thread which remains active and determines the available proportion of cycles for program issue that are unused by that active program thread as indicated from its performance value. Thus, if the program thread which remains active has a performance value indicating a proportion of 0.75, then this active program thread would be well matched to the active at the same time as a program thread which had a performance value indicating a performance of 0.25, as together these would combine to indicate a proportion of usage of unity. The next thread selection circuitry 46 is configured to search through the performance values associated with the threads identified in the inactive thread registers 48 in turn to determine which of these has a performance value indicating that it is suited to the active at the same time as the program thread which is remaining active. This suitability may be judged as the combination of performance values indicating a proportion of issue cycles used being a smallest value that exceeds unity (or alternatively a value that is not less than unity). If two currently inactive program threads performance value which are equally well matched to the performance value of the program thread which is remaining active, then the inactive program thread which has been inactive for longest may be selected as the next program thread. The action of the issue control circuitry 28 in selecting which program threads are to be active at any given time performs coarse grained multithreading (CGMT).

The next thread selection circuitry 46 additionally includes a mechanism to ensure that a given program thread does not permanently remain inactive. Accordingly, the issue control circuitry 28 selects in dependently of the performance values within the performance value registers 42 a program thread as a next thread to be active if that program thread has not been selected for greater than a predetermined number of thread selections made by the issue control circuitry 28. This effectively guarantees that a program thread will gain at least some execution time however incompatible it is with the other program threads.

The instruction queue 24 in this example embodiment performs in-order instruction issue from within each of the program threads. Other embodiments which perform out-of-order instruction issue are also possible if it is appropriate to support the additional complexity. The issue queue 24 may issue a single program instruction each cycle or in other embodiments multiple instructions on each cycle.

Figure 3:
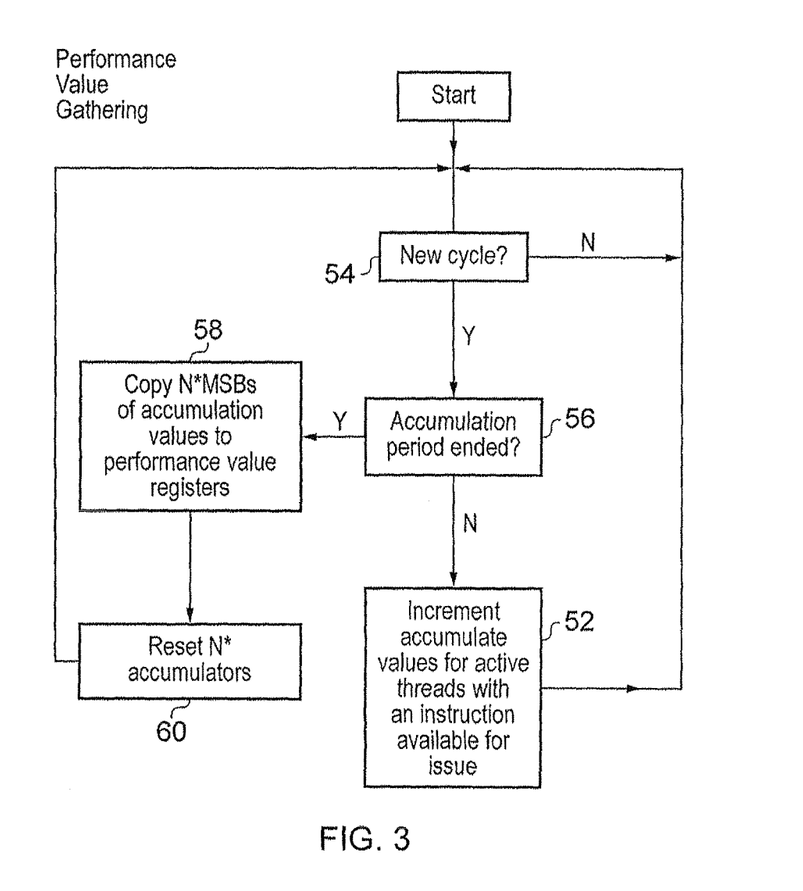
FIG. 3 is a flow diagram schematically illustrating performance value gathering.

FIG. 3 is a flow diagram schematically illustrating the operation of the performance monitoring circuitry 30 in gathering performance values. At step 54 processing waits until each processing cycle is commenced. Step 56 then determines whether the current accumulation period has ended. If the current accumulation period has ended, then step 58 copies the most significant bit portion of the accumulated values from the counters 32, 34 in to the appropriate ones of the performance value registers 42. Step 60 then resets the counters 32, 34 and processing returns to step 54.

If the determination at step 56 is that the accumulation period has not ended, then processing proceeds to step 62 where the accumulate value for each of the currently active threads TA, TB is incremented if that program thread has an instruction available for issue during this cycle. The program thread may not have a program instruction available for issue for reasons such as a data hazard or that a branch misprediction has occurred such that program instructions for that program thread are still being fetched from the memory 6 and have yet to reach the instruction queue 24.

Figure 4:
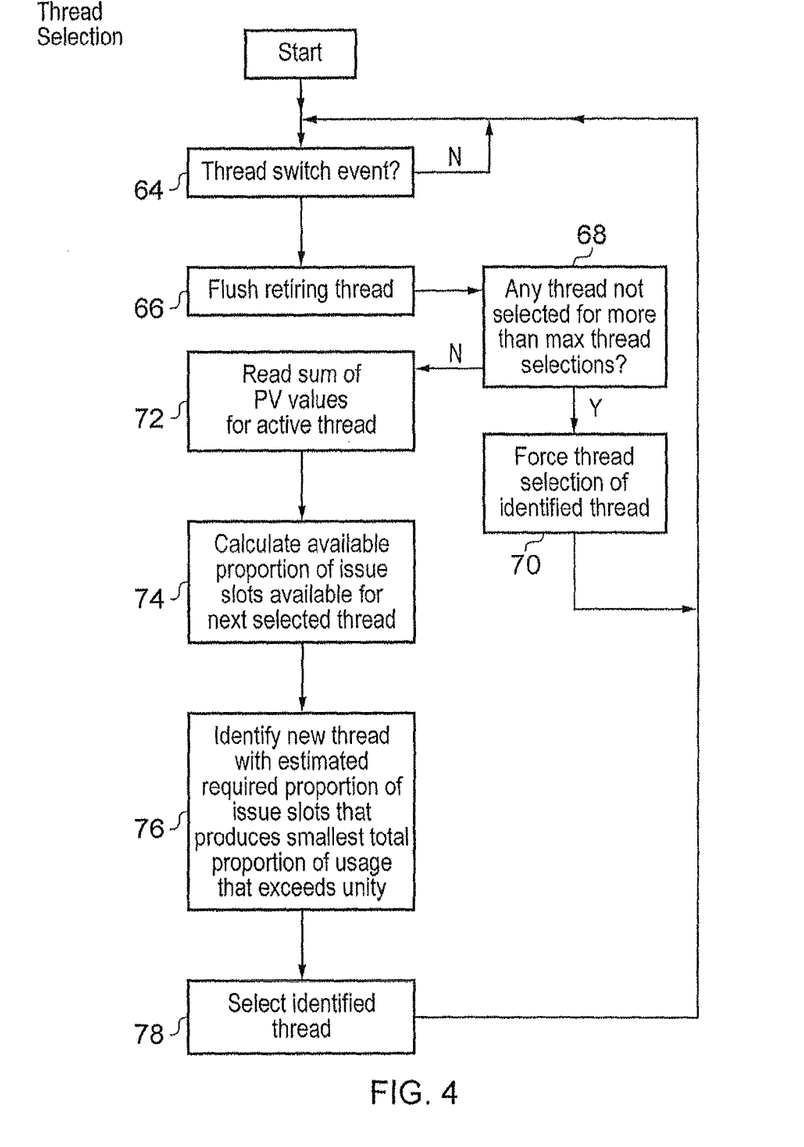
FIG. 4 is a flow diagram schematically illustrating thread selection.

FIG. 4 is a flow diagram schematically illustrating thread selection as performed by the issue control circuitry 28 in response to a thread switch event. At step 64 processing waits until a thread switch event occurs. Step 66 then flushes the retiring thread and its associated state data. Step 68 determines whether any currently inactive thread has not been selected for more than the maximum permitted number of thread selection instructions. If there is such a thread identified, then step 70 forces the selection of that thread as the next thread to be executed and processing returns to steps 64.

If the determination at step 68 is that there is no currently inactive program thread which has not been selected for greater than the maximum permitted number of thread selections, then processing proceeds to step 72 where the sum of the performance values of the thread(s) which is to remain inactive is read. When there is only one thread which is to remain active (i.e. a system which interleaves two program threads), then this step 72 may simply be the reading of the performance value for the program thread which is remaining active. However, if more than two program threads are supported as being active at any given time, and thus multiple program threads are to remain active, then step 72 then may sum their performance values.

Step 74 then calculates the available portion of issue slots which will be available for the next selected thread given the demands of the program thread which is remaining active. Step 76 then identifies the new thread which from its performance value has an estimated required proportion of issue slots that produces the smallest total proportion of issue slots required which exceeds unity. These two threads will substantially fully utilise the execution circuitry 12 if they perform as predicted and yet will not unduly compete with each other for execution resources. Step 78 then selects the identified thread and processing returns to step 64.

The invention claimed is:

1. Apparatus for processing data comprising:
   execution circuitry configured to execute program instructions;
   issue control circuitry coupled said execution circuitry and to configured to select program instructions from among a plurality of program threads to form a sequence of program instructions to issue to said execution circuitry, said issue control circuitry being configured to select said program instructions such that program instructions from different program threads of said plurality of program threads are interleaved within said sequence; and
   thread performance monitoring circuitry coupled to issue control circuitry and configured to measure a plurality of performance values, each of said plurality of performance values being indicative of a performance parameter of one said plurality of threads; wherein
   said issue control circuitry is configured to select from which of said plurality of program threads program instructions are to be issued to said execution circuitry in dependence upon said plurality of performance values, wherein said issue control circuitry selects program instructions for issue at each issue cycle of a sequence of issue cycles and said plurality of performance values indicate for each one of said plurality of program threads a proportion of issue cycles within said sequence of issue cycles for which a program instruction of said one of said plurality of program threads is available for issue.

2. Apparatus as claimed in claim 1, wherein said issue control circuitry selects a next program thread from which program instructions are issued such that in combination with those program threads currently selected a proportion of issue cycles for which program instructions are predicted by said performance values to be issued is a smallest value that exceeds unity.

3. Apparatus as claimed in claim 1, wherein said issue control circuitry selects a next program thread from which program instructions are issued such that in combination with those program those currently selected a proportion of issue cycles for which program instructions will be issued is not less than unity.

4. Apparatus as claimed in claim 1, wherein said issue control circuitry is configured to determine a program instruction of said one of said plurality of program threads is not available for issue in an issue cycle if any one of:
   (i) a next instruction to issue from said one of said plurality of program threads has a data dependence upon an operand value that is not yet available; and
   (ii) a next instruction to issue from said one of said plurality of program threads has yet to compete being fetched from a memory storing said next instruction.

5. Apparatus as claimed in claim 1, wherein said thread performance monitoring circuitry comprises a counter for each program thread selected to issue program instructions and said counter is configured to accumulate a count value in dependence upon whether a corresponding program thread of said plurality of program threads has a program instruction available for issue.

6. Apparatus as claimed in claim 5, wherein said counter is configured to accumulate said count value over a predetermined accumulation period after which said count value is reset and accumulation restarted.

7. Apparatus as claimed in claim 6, wherein said predetermined accumulation period is a user configurable parameter.

8. Apparatus as claimed in claim 1, wherein said issue control circuitry is configured to select for issue, independently of said plurality of performance values, program instructions from a program thread from which program instruction have not been selected for greater than a predetermined number of thread selections made by said issue control circuitry.

9. Apparatus as claimed in claim 1, wherein said issue control circuitry is configured to perform in-order program instruction issue from within each of said plurality of program threads.

10. Apparatus as claimed in claim 1, comprising issue queue circuitry configured to store program instructions of each of said plurality of program threads to form pool of ready-to-run instructions.

11. Apparatus as claimed in claim 1, wherein said issue control circuitry is configured to continue to select program instructions to issue from a given one of said plurality of program threads until occurrence a thread switch event, whereupon said issue control circuitry selects from which of said plurality of program threads program instructions are to be issued to said execution circuitry in dependence upon said plurality of performance values.

12. Apparatus as claimed in claim 11, wherein said thread switch event is at least one of:
   (i) a miss within a cache memory;
   (ii) a timer triggered event;
   (iii) a yield to another thread event;
   (iv) a miss within a translation lookaside buffer; and
   (v) an external interrupt request.

13. Apparatus as claimed in claim 1, wherein said issue control circuitry is configured to issue one or more program instructions to said execution circuitry at one time.

14. Apparatus as claimed in claim 1, wherein said issue control circuitry is configured to interleave program instructions from two program threads.

15. Apparatus for processing data comprising:
   execution means for executing program instructions;
   issue control means coupled said execution means for selecting program instructions from among a plurality of program threads to form a sequence of program instructions to issue to said execution means, said issue control means selecting said program instructions such that program instructions from different program threads of said plurality of program threads are interleaved within said sequence; and
   thread performance monitoring means coupled to issue control means for measuring a plurality of performance values, each of said plurality of performance values being indicative of a performance parameter of one said plurality of threads; wherein said issue control means selects from which of said plurality of program threads program instructions are to be issued to said execution means in dependence upon said plurality of performance values, wherein said issue control means selects program instructions for issue at each issue cycle of a sequence of issue cycles and said plurality of performance values indicate for each one of said plurality of program threads a proportion of issue cycles within said sequence of issue cycles for which a program instruction of said one of said plurality of program threads is available for issue.

16. A method of processing data comprising the steps of:
selecting program instructions from among a plurality of program threads to form a sequence of program instructions to issue, said step of selecting operating to select said program instructions such that program instructions from different program threads of said plurality of program threads are interleaved within said sequence; and
executing said program instructions that are issued; and
measuring a plurality of performance values, each of said plurality of performance values being indicative of a performance parameter of one said plurality of threads; wherein
said step of selecting selects from which of said plurality of program threads program instructions are to be issued for execution in dependence upon said plurality of performance values, wherein said step of selecting selects program instructions for issue at each issue cycle of a sequence of issue cycles and said plurality of performance values indicate for each one of said plurality of program threads a proportion of issue cycles within said sequence of issue cycles for which a program instruction of said one of said plurality of program threads is available for issue.

17. A method as claimed in claim 16, wherein said step of selecting selects a next program thread from which program instructions are issued such that in combination with those program those currently selected a proportion of issue cycles for which program instructions are predicted by said performance values to be issued is a smallest value that exceeds unity.

18. A method as claimed in claim 16, wherein said step of selecting selects a next program thread from which program instructions are issued such that in combination with those program those currently selected a proportion of issue cycles for which program instructions will be issued is not less than unity.

* * * * *